United States Patent [19]

Dewey et al.

[11] 4,223,000
[45] Sep. 16, 1980

[54] DECOMPOSITION OF ALUMINUM NITRATE

[75] Inventors: John L. Dewey; Charles E. Scott; John C. Rushing, all of Little Rock, Ark.

[73] Assignee: Reynolds Metals Company, Richmond, Va.

[21] Appl. No.: 61,297

[22] Filed: Jul. 27, 1979

[51] Int. Cl.$^2$ ............................................. C01F 7/30
[52] U.S. Cl. .............................. 423/631; 423/390 J; 423/DIG. 16
[58] Field of Search ............... 423/123, 125, 631, 132, 423/DIG. 16, 390

[56] References Cited

U.S. PATENT DOCUMENTS

| | | | |
|---|---|---|---|
| 1,652,119 | 12/1927 | Halvorsen et al. | 423/631 |
| 3,383,166 | 5/1968 | Gerry et al. | 423/123 |
| 3,622,271 | 11/1971 | Kelly et al. | 423/390 |
| 3,647,373 | 3/1972 | Heiska et al. | 423/631 |
| 3,869,543 | 3/1975 | Schutte et al. | 423/390 |

FOREIGN PATENT DOCUMENTS 367525  2/1932  United Kingdom ..................... 423/631

*Primary Examiner*—Herbert T. Carter
*Attorney, Agent, or Firm*—Glenn, Lyne, Girard & McDonald

[57] ABSTRACT

There is described a method for the decomposition of aluminum nitrate crystals to alumina comprising the steps of:
  (a) melting the aluminum nitrate crystals;
  (b) evaporating from the melted crystals in a once through evaporator at the boiling temperature of the mixture and for a time sufficient to remove water and associated nitric acid and to provide a fluid having an alumina concentration of at least about 18% by weight;
  (c) decomposing the product of step (b) at a temperature of between about 150° and about 200° C. and recovering the heat of condensation of the resultant vapors;
  (d) further decomposing the product of step (c) in a fluidized bed decomposer at a temperature of between about 300° and about 400° C. to reduce the residual nitrate concentration in the product to between about 5 and about 10 weight percent;
  (e) decomposing the product of step (d) in a fluidized bed decomposer at a temperature of between about 500° and about 800° C. to reduce the residual nitrate concentration in the product to below about 3 percent by weight; and
  (f) calcining the product of step (e) at a temperature of at least about 1000° C.

6 Claims, No Drawings

DECOMPOSITION OF ALUMINUM NITRATE

FIELD OF THE INVENTION

The present invention relates to a novel process for the decomposition of aluminum nitrate nonahydrate to produce alumina.

BACKGROUND OF THE INVENTION

There are a number of patents and publications relating to the decomposition of aluminum nitrate. In U.S. Pat. No. 1,702,410 (Feb. 10, 1931) to Max Buchner, it is stated (p. 3, line 75-83)—"The decomposition of aluminum nitrate may be effected by heating it in the solid, crystallized or dissolved state, or in the state in which it occurs after the last step in the process, if desired, with the introduction of gases, or of water or steam. In this way nitric acid of any desired concentration can be produced." The patent goes on to say (p. 3, line 102-10-5)—"In this way about 92% of the nitric acid in the aluminum nitrate can be recovered; therefore, nitrous gases are formed only in small quantity."

U.S. Pat. No. 2,737,445, issued Mar. 6, 1956 in the name of Ernest Samuel Nossen describes a process for the thermal decomposition of metal nitrates including aluminum nitrate. The process involves the addition of steam (and other gases) to form nitric acid vapors for recovery of nitric acid in liquid form. In this patent, the starting material could be either solid or aqueous metal nitrate.

Other patents and publications describing the decomposition of metal nitrates include German Pat. No. 556,882, issued to Dr. Fritz Gewecke on Aug. 15, 1932 and two articles by this same Dr. Gewecke, one in Die Chemical Fabrik No. 21-22, pp. 199-209 (1934), the other in Chemiker-Zeitung, No. 15, pp. 157-58 (1936). The Gewecke patent and publications disclose the complete thermal decomposition of aluminum nitrate by (a) heating the metal nitrate in the form of a thin film to a temperature higher than the temperature of its decomposition, (b) in the presence of steam to obtain a solid product and substantially complete recovery of all nitric acid.

Several publications by the Atomic Energy Commission describe the practice of decomposition of aluminum nitrate. These publications also describe in considerable detail, equipment used in such decomposition. Among the publications of interest are the following by the Atomic Energy Division of Phillips Petroleum Company, Idaho Falls, Idaho: "Pneumatic Atomizing Nozzles in Fluidized Bed Calcining, Part I-Calibration Tests" by Legler and Stevens, IDO-14548, TID-4500, Ed. 16, and "Pneumatic Atomizing Nozzles in Fluidized Bed Calcining-Part II Process Tests" by Leglar and Brown, IDO-14631, TID-4500 (32st Edition), issued July 1964. The latter report describes decomposition tests of aluminum nitrate waste solutions in a fluidized bed calciner with considerable description of feed nozzle selection and operation. Particle size control is discussed in detail. Similar information is reported by Legler in an article published in "Chemical Engineering Progress" in February 1967 titled "Feed Injection for Heated Fluidized Beds." Earlier, Cooper and Black of Phillips Petroleum, Idaho Falls, Idaho, had published "Pilot-Plant-Scale Fluidized Bed Calciners," CEP (Vol. 61, No. 7, July 1965). The kinetics of particle growth in fluidized bed calcination of aluminum nitrate solutions (radioactive waste liquor from nuclear fuel reprocessing) was investigated by Lee et al. in "Kinetics of Particle Growth in A Fluidized Calciner," AIChE Journal, Vol. 8, No. 1, March 1962, pp. 53-58. The AEC publications referenced earlier give various references to earlier work at Idaho, the earliest cited being—Crimet, E.S. "Calcination of Aluminum-Type Reactor Fuel Wastes in a Fluidized Bed," IDO-14416, August 1957.

U.S. Pat. No. 3,869,543 (Mar. 4, 1975), and U.S. Pat. No. 3,898,043 (Aug. 5, 1975) in the names of Schutte and Stevens, assigned to Arthur D. Little, Inc. describes a method and apparatus, respectively, for decomposition of aqueous aluminum nitrate solution to form an alumina product and nitric acid. The apparatus described is a conventional fluidized bed design with indirect heating coils. One notable feature of the heating tubes described in the patent is their U-tube arrangement in the fluidized bed design with indirect heating coils. Such an arrangement would be impractical for using a condensing heat transfer fluid, such as steam, due to difficulty in withdrawing the condensate.

The A.D. Little U.S. Pat. No. 3,869,543 describes aluminum nitrate decomposition in a method using at least two separate beds of fluidized particles and fluidizing the bed particles of one of the beds with steam, while using the off-gases effluent from one bed fluidized with steam as the fluidizing gas for the remaining beds. There is also described the separation of off-gases into nitric acid and water vapor containing noncondensable oxides of nitrogen and the subsequent condensing of the water vapor thereby removing the oxides of nitrogen. There is no mention of recovering of the heat of condensation from the condensing of nitric acid and water vapor. In U.S. Pat. No. 3,898,043, the production of a material presenting no handling problems is stated as an objective. The patent discusses problems reported in the prior art of handling a sticky, glue-like material formed during the hydrolysis process. The A.D. Little patent purports to resolve this problem by an improved decomposition process. The A.D. Little patent admits to prior patents using steam for hydrolysis to recover substantially all the nitrate values from decomposition as nitric acid, but states that the problems of the prior art are overcome (col. 3, line 2. U.S. Pat. No. 3,898,043). This is supposedly done by feeding an aluminum nitrate solution corresponding to the composition of melted $AL(NO_3)_3.9H_2O$ ANN crystals into a fluidized bed, which is maintained at a temperature between about 150° and 210°.

A number of publications exist relating to fluidized bed design and operation. Of particular interest are those by F. A. Zenz, such as "How Flow Phenomena Affect Design of Fluidized Beds," Chemical Engineering, Dec. 19, 1977, pp. 81-91. In this article, Dr. Zenz teaches the concept of jet penetration into particle beds as the critical consideration in preventing scale formation on the nozzle and providing adequate atomization.

SUMMARY OF THE INVENTION

According to the present invention, there is provided a method for the decomposition of aluminum nitrate crystals to alumina comprising the steps of:

(a) melting the aluminum nitrate crystals;

(b) evaporating from the melted crystals in a once through evaporator at the boiling temperature of the mixture and for a time sufficient to remove water and associated nitric acid to provide a fluid having an alumina concentration of at least about 18% by weight;

(c) decomposing the product of step (b) at a temperature of between about 150 and about 200° C. and recovering the heat of condensation of the resultant vapors;

(d) further decomposing the product of step (c) in a fluidized bed decomposer at a temperature of between about 300 and about 400° C. to reduce the residual nitrate concentration in the product to between about 5 and about 10 weight percent;

(e) decomposing the product of step (d) in a fluidized bed decomposer at a temperature of between about 500 and about 800° C. to reduce the residual nitrate concentration in the product to below about 3 percent by weight; and (f) calcining the product of step (e) at a temperature of at least about 1000° C.

DETAILED DESCRIPTION OF THE INVENTION

In the method described herein for decomposing molten ANN, heat of condensation from an evaporator and a low temperature decomposition stage is recovered and used in various parts of the alumina extraction process, particularly in the aluminum nitrate nonahydrate melter and purification process. Also, plant energy consumption is minimized by using off-gas vapor from the decomposer as fluidizing gas as per Canadian Pat. No. 906,735 to Markey (Aug. 8, 1972). Steam is not used except, possibly, during start-up. This concept differs from that of A.D. Little in that in the A.D. Little method steam is added to at least the first decomposer. The addition of steam imposes an energy penalty due to the additional plant evaporation load to remove the steam and is not necessary.

In the method described herein, the naturally occurring concentration of water vapor in the first stage decomposer, upwards of 70 volume %, is thought to be sufficient to retard the formation of noncondensable $NO_X$ gases from nitric acid.

A preferred embodiment of the method described herein for the decomposition of aluminum nitrate to alumina, nitric acid, and various gases including $NO_X$, $H_2O$, and $O_2$ involves feeding to the decomposition process washed aluminum nitrate nonahydrate (Al($NO_3$)$_3$.9H$_2$O) crystals and adhering wash liquor obtained in the purification step as described in U.S. Pat. No. 3,804,598. The feed crystals and adhering wash liquor are sent to a melting step where the crystals are melted and the resulting feed solution is preheated before feeding to an evaporative step. The objective of the evaporative step is to provide as much evaporation as possible while producing a feed liquor to a low temperature decomposer that is sufficiently fluid to feed through the nozzle means into the fluidized bed.

The preliminary removal of $HNO_3$ and $H_2O$ by evaporation is more economical in an evaporator than in a decomposer due to a higher overall heat transfer coefficient in an evaporator. Thus, economics favor removal of as much vapor as is practical in the evaporative step. Alternatively, however, the low temperature decomposer may be fed directly with aluminum nitrate nonahydrate melt, or diluted melt, if desired, or other aluminum nitrate containing streams, such as impurity purge streams produced during preparation of the purified ANN crystals.

The evaporator is preferably a long-tube, once-through evaporator, primarily because of its economic advantages. The long tube evaporator comprises a cylindrical closed-end shell supplied with steam through which relatively long heat-exchanger tubes extend. Liquor flows once through the tubes entering at one end and discharging at the other as a mixture of liquid and vapor. Preferably, the tubes are sufficiently long to provide adequate pressure drop to insure an even distribution of feed liquor among the tubes. A vapor header and/or vapor-liquid separators separate the vapor from concentrated liquid. The concentrated liquid is removed from the evaporator and is not recycled. Vapor is routed to a suitable process heat recovery condenser.

The liquor is quickly evaporated to the desired concentration and precipitation of hydrated basic aluminum nitrates is normally avoided. Solution concentrations of 20% to 22% $Al_2O_3$, or even higher if desired, can be achieved in the long-tube, once-through evaporator. This can be accomplished also in a recirculating evaporator operating above about 200° C. However, we have found that at more practicable operating temperatures and resultant pressures, basic aluminum nitrates precipitate in a recirculating evaporator at liquor concentrations upwards of about 16% $Al_2O_3$ and that the resultant vapors have undesirably lower $HNO_2$ concentrations than vapors produced as described above.

Various heat transfer media may be used on the shell side of the evaporator to supply heat. The heat flows through the tube walls to the liquor. Steam is the conventionally used fluid, although in this method a heat transfer medium flowing counter currently from a decomposition stage may also be used. It is within the existing art to design and operate a suitable once-through evaporator and select a suitable heat transfer medium to accomplish the concentration of the aluminum nitrate liquor in the evaporative step. The aluminum nitrate solution feeding the evaporator, which is obtained by melting Al($NO_3$)$_3$. 9H$_2$O crystals and adhering wash liquor, is in a concentration range of about 13 to 13.5% $Al_2O_3$. The evaporator vapor concentration is in the range of about 45 to 55% $HNO_3$ (by weight). The evaporator vapor head operating pressure is in the range of about 10–20 psig or even higher if desired, with a corresponding temperature range of about 125 to 165° C. Preferably, the autogenous vapor pressure of the evaporator is sufficient to push evaporator discharge liquor through the decomposer feed nozzle without the need of a pump. A feed pump may be used, however, if required, but sufficient net positive suction head must be provided. Precautions must also be taken to prevent freezing of the concentrated aluminum nitrate solution in the pipe or pump. Insulation normally provides such protection.

The evaporator vapor consists essentially of condensable nitric acid and water wapor with only minimal non-condensables, such as air dissolved in the feed. The heat of condensation of this vapor is recovered in a condenser on the melter, which melts the evaporator feed, and/or in heat sinks required for the preparation of ANN crystals. The heat of condensation and any sensible heat due to cooling of superheated vapor or subcooling of condensate is transferred through the tubes to the melting crystals and adhering mother liquor or to the melt. It is within the state of the art to properly design and operate appropriate condensing systems to recover this heat for beneficial reuse, as aforesaid or for the generation of steam.

The objective of the low temperature decomposer is to remove $HNO_3$ and $H_2O$ from the concentrated feed solution such that the evolved vapor will be condensable to aqueous nitric acid at elevated temperature with a minimum of noncondensable vapors present in order to maximize heat recovery for beneficial reuse. This objective is accomplished by feeding the evaporator discharge to a first stage decomposer, of fluidized bed design, controlled in a temperature range of 150° C. to 200° C. with a preferred temperature range of about 170° C.–190° C. At temperatures above about 195° C. undesirable amounts of $NO_X$ gases begin to form, the presence of which increases the difficulty of condensation in the heat recovery condenser.

The fluidized bed may be a conventional design with a chamber, usually cylindrical, containing a fluidized bed of particles and a vapor disengaging section at the top. A gas distribution plate with tuyeres or pipe with downward facing holes is mounted horizontally, near the bottom of the decomposer as is common practice in design of a fluidizing bed. Fluidizing gas is admitted through this distribution plate. Fluidizing gas is provided by recycled vapor from the first stage decomposer. Liquor from the evaporator is fed to the fluidized bed under pressure through a nozzle or nozzles mounted usually in the side chamber below the level of the fluidized bed.

It is known in the art to design and operate nozzles for introducing feed liquor to a fluidized bed in a manner to reduce the formation of scale deposits on the nozzles. The publications of the Atomic Energy Commission cited hereinabove include detailed descriptions of nozzles used in their installations. Based on tests of various nozzle types, the AEC selected a pneumatic atomizing nozzle of the two-fluid, external-mixing type for introducing feed to their fluidized bed calciner. (IDO-14631, p. 2).

Zenz ("Bubble Formation and Grid Design," I. Chem. E. Symposium Series No. 30, 1968: Instn. Chemical Engineers, London, P. 3–8) discusses the importance of penetration into the fluidized bed for atomizing gas and liquid feed in providing a properly atomized feed that will minimize scaling and presents mathematical relations which may be used for design. Penetration depth is a function of the velocity and density of the fluid through the nozzle, and the Zenz reference gives quantitative correlations for this relationship. Atomizing gas for the nozzle is supplied by vapor from the first stage decomposer. Steam or air may also be used for atomizing fluid, particularly for start-up.

Heat is supplied to the fluidized bed indirectly through heat transfer tubes, preferably finned, mounted in the bed with one of various possible heat transfer media circulating inside the tubes, such as steam, molten salt, NAK, or aromatic mineral oils such as Dowtherm. A furnace fired by an acceptable fuel is used to provide heat to the medium. The medium is caused to circulate through heating means wherein it absorbs heat and then through the tubes of the fluid bed and back to the heating means. Alternatively, the heat transfer medium circulating through the second stage decomposer may be used to circulate through the first stage heat transfer tubes after it leaves the second stage. The particular alternate selected will depend on a heat balance and economics of the total system. It is within the state of the art to design such a heating system to minimize energy consumption, while providing the heat required to achieve the desired decomposition and temperature level.

If steam is used as the heat transfer medium, then a preferred arrangement of the heat transfer tubes within the fluidized bed is a vertical configuration with steam entering at the top and condensate leaving at the bottom. The U.S. Atomic Energy Commission (publications cited above) used horizontal bayonet type heaters with NAK as the heat transfer medium. The A.D. Little patents discussed above show vertical U-tube arrangement of the heat transfer tubes, which would be satisfactory for single phase media but not for condensing media, such as steam. Condensate removal would be a problem in the latter case. In an experimental fluidized bed, we have successfully employed a vertical tube assembly with steam introduced at the top and condensate withdrawn through a trap at the bottom.

The heat input is controlled to maintain a temperature that will insure a sufficiently low level of noncondensables in the vapor. An acceptable noncondensable level can be judged by the heat transfer coefficient in the heat recovery device. The lower the noncondensable level, the higher will be the heat transfer coefficient. Maximizing the heat transfer coefficient will maximize heat recovery, which is a major objective of the first stage decomposer. As mentioned previously, the preferred control temperature is about 170° C.–190° C. The volumetric percent of water vapor in the first stage decomposer off-gas resulting from stoichiometry of the decomposition during proper operation is in the range of about 65 to 75 percent. This concentration of water is considerably above that indicated in the A.D. Little patents as necessary to provide sufficient hydrolysis to promote formation of condensable nitric acid vapor and suppress noncondensable $NO_X$ gas formation. Addition of steam at this stage is redundant; it merely dilutes the acid resulting in a penalty in energy to evaporate the water therefrom. Steam or air may be used as fludizing gas during start-up but it is replaced as soon as practical by recycled decomposer vapor.

Vapors from the first stage decomposer are condensed, and the heat of condensation is recovered to provide heat to various heat sinks in the process, particularly in the aluminum nitrate nonahydrate purification step. Any noncondensables that may be present are sent to an acid reconstitution area.

Particle size control in fluidized beds is discussed in some detail in the publication by the AEC previously cited. The significant variables in particle size control are nozzle gas-to-feed volumetric ratio, bed operating temperature, fluidizing gas velocity and feed solution concentration. The rate of elutriation of fines at a given temperature usually increases as nozzle atomizing gas-to-liquid feed ratio increases. ("Feed Injection for Heated Fluidized Beds," by B.M. Legler, FIG. 4, p. 77). The recovered portion of these fines is recycled to the bed, and if additional fines are needed to provide sufficient seed particles to maintain particle size control controlled amounts of fines recovered from the off gases of the second and third stage decomposers described hereinafter may be added also. It is also known to produce fines within the bed by the grinding action of a jet impinging on a breaker plate or to grind large particles externally and add the fines to the bed. The overall heat transfer coefficient from the heating tubes to the fluidized bed primarily depends on the mass median particle diameter and the superficial fluidizing air velocity. At a fixed fluidizing air velocity, the heat transfer rate increases with a decrease in the particle size.

Spray drying per se is not desired in the fluidized bed calcination process because the resulting small, low-density particles are subject to rapid elutriation. Spray drying is deliberately minimized by maintaining the fluidized bed level high enough to ensure submergence of the spray zone within the bed of moving particles.

The fluidized bed decomposer is equipped with a dust collection system, preferably a cyclone, and collected dust is returned to the fluidized bed. Any uncollected dust accompanies the off-gas to the heat recovery unit, wherein it dissolves in the condensed acid.

As used herein, high temperature refers to a temperature of between about 540° C. and 800° C., medium temperature to a temperature of between about 300° C. and about 400° C. and low temperature to a temperature of between about 150° and about 200° C.

The primary objective of the second and third stage decomposers is to remove most of the remaining nitrate from the solid particles discharging the first stage decomposers. Although this further decomposition may be accomplished in a single unit, the preferred method is to divide the operation into medium and high temperature steps to minimize energy consumption and reduce equipment size. The preferred embodiment employs fluidized bed decomposers in a single vertical shell with characteristics as described previously for the low temperature stage fluidized bed decomposer. In the preferred embodiment, fluidizing gas passes countercurrently from the third (high temperature) stage to the second (medium temperature) stage. Fluidizing gas for the high temperature stage is provided by recycling a portion of the off-gas from the medium temperature stage decomposer. Vapor from the medium temperature third stage that is not required for fluidization in the high temperature stage is routed to a sensible heat recovery unit, such as a waste heat boiler, and then to an acid reconstitution process. Alternatively, off-gas from either the second stage or the third stage may be recycled on itself to provide fluidizing and atomizing gas. The remaining off-gases from the stages are routed to a sensible heat recovery unit, such as a waste heat boiler, and then to acid reconstitution. During the start-up steam or air may be used for fluidizing gas.

Solid particles pass from the second stage decomposer to the third stage decomposer and then to the calciner. There are several methods within the existing art to transport solids, including gravity, pneumatic, and mechanical. The preferred method is gravity overflow of solids from the first to the second stage, second to third stage and third to calciner. An air lock device such as a rotary air lock may be necessary to prevent bypassing of fluidizing gases through the solids transport line. Alternatively, screw conveyors and screw feeders may be used with appropriate air lock devices. Drag conveyors or inclined screw conveyors may be required if space limitations prevent gravity feeding. In order to minimize the possibility of alpha alumina formation, it is desirable to minimize the residence time of the solid particles in the fluidized bed. Alpha alumina production in the second or third stage decomposer is undesirable, because it is virtually insoluble in nitric acid. Consequently, a solids trap would have to be provided in the reconstitution process to intercept dust particles escaping the dust collection system on the second or third stage decomposers. In addition, alpha alumina tends to erode the equipment.

Residence times of less than an hour in the decomposers can permit the necessary transfer of heat to the solid particles for the desired decomposition. Preferably, the second stage decomposer residence time will be less than about 4 hours, and the third stage residence time will be 2 hours or less, as determined by the bed volume required to incorporate the needed heat transfer surfaces. It is known to use extended surface, i.e., finned, tubes with 1 to 2 inch clearance between tubes in a bed with relatively large length to diameter ratio whereby the heat transfer surface per unit of volume is maximized with resultant minimizing of solids hold-up time and whereby the bed cross-section area is minimized to reduce the amount of recycled gases and energy required to maintain fluidization.

The second stage fluidized bed decomposer is operated within a temperature range of about 300° to 400° C. to reduce the residual nitrate concentration in the solid product to 5 to 10 weight percent $NO_3$. The third stage decomposer operates in the range of about 540 to 800° C. to reduce the residual nitrate in the solid product to less than 2 weight percent. The primary components of the second and third stage decomposer vapors are $H_2O$ upwards of about 50 volume %, and NO, $NO_2$ and $O_3$ in concentrations approaching equilibrium at the operating temperature.

Preferably, heat is supplied to the second and third stage decomposers indirectly in a manner similar to the method of the first stage decomposer. An appropriate heat transfer medium, such as molten salt or NaK, circulates through heat transfer tubes, preferably finned, mounted within the fluidized bed. In a preferred embodiment, the heat transfer fluid circulates countercurrently, passing first into the third stage decomposer and then into the second stage, before returning to the furnace to be heated. This countercurrent method is used to achieve optimum heat economy. Additional heat transfer fluid is added directly to the second stage circulation system, if required. Alternatively, if the heat balance indicates it is possible and economical, the heat transfer fluid may also be circulated from the second stage to the first stage and then back to the furnace for reheating. The heat transfer fluid itself is heated in a furnace or furnaces fired by an appropriate economical fuel such as coal and caused to circulate as described hereinabove.

If NaK is used as the heat transfer medium a portion of it must be cooled and filtered to remove sodium oxides. The cooling may be done by circulating NAK through the first stage decomposer, the evaporator, or other appropriate heat sinks. The particular method used will depend on process requirements and economics.

Although fluidized beds are preferred for the second and third stage decomposers, other types of calciners may be used. Indirect heat exchange is required however, so that the off-gas will be reconstitutable to nitric acid in an economical manner. Selection of particular decomposition equipment will depend on process economics.

The final calcination step is designed to remove the residual nitrate and substantially all of the water from the solid product to give a metallurgical, chemical or refractory grade of alumina. The calcination may be performed in a fluidized bed or other type of calciner such as a rotary. The preferred embodiment is a fluidized bed calciner. The calcination is performed in a temperature range of about 1000° to about 1200° C. Heat is supplied directly by combustion of a clean fuel, such as natural gas or a suitable fuel oil. A clean fuel must be used in the calcination step to prevent contamination of the alumina. It is well within the known art to design and operate an effective, economical calcination process to achieve a desired grade of alumina.

Also well known in the art is the method of operating the calciner with a slightly rich mixture of fuel to produce a reducing atmosphere, which reacts with the possible $NO_X$ gases to convert them to harmless $N_2$. Air is subsequently added ahead of the waste heat boiler through which the off gases pass for heat recovery to burn any uncombusted fuel.

The waste heat boiler is equipped with appropriate pollution control equipment for removing alumina dust. Additional $NO_X$ control equipment may be added if desired, but the various published references on control of $NO_X$ in stationary fired equipment indicates that no further treatment will be necessary if the system is designed and operated properly.

The decomposition method thus is begun by melting aluminum nitrate nonahydrate crystals prepared in the fractional crystallization of ANN (U.S. Pat. No. 3,804,598) and comprising an equivalent concentration of alumina, usually of around 13 to 13.5 weight percent. The melting is preferably performed with heat supplied from the heat of condensation of nitric acid vapors. The melted nitrate is pumped at a controlled rate into an evaporator, which includes vapor-liquid separation means, of a particularly preferred type, commonly referred to as a long tube vertical evaporator. In passage through the evaporator the liquor is warmed to boiling and then partially evaporated within the tube to yield, after separation in the separator, a liquor comprising about 18 to 22% alumina concentration at a temperature preferably within the range of about 150° to 165° C.; and a resultant vapor phase with a nitric acid concentration within the range of about 48 to 52% $HNO_3$ at a super-atmospheric pressure. The pressure may be selected as desired and controlled within the range of about 5 to 30 psig, or higher if desired. The vapor is condensable at elevated temperatures to nitric acid solutions as is required for recovery of the heat of condensation for supply to the melter or to other similar type equipment within the plant or if desired for the generation of low pressure steam. The concentrated liquor is pushed by the pressure developed in the evaporator through a suitable conductance means and through a suitable nozzle into the bed of a fluidized bed reactor means wherein the temperature of the bed is maintained at about 150° to about 200° C. by indirect transfer from a suitable fluid heat supply means, as for instance steam or NaK, and wherein the fluidizing bed particles, comprising partially decomposed aluminum nitrate material, grow by accretion of thin layers of the said liquid which in turn partially decompose to the composition of the said bed particles with formation of a vapor phase comprising nitric acid and water. A portion of the vapor is condensed externally of the reactor, at elevated temperature, to recover as useful heat the heat of condensation thereof and a second portion is compressed by a suitable compressor means, with suitable interstage coolers as may be required to prevent the temperature of the vapors from exceeding about 250° C., preferably 225° C. The compressed vapors are returned to the fluidized bed to supply the required fluidization gas and any atomizing gas that may be required by the spray nozzles. In this manner, no extraneous gases, as for instance air or steam, need be supplied to the unit during normal operation. The operating temperature range within the range of about 150° to 200° C. and which in fluid beds is easily controlled to within 5° or 10° C., is selected to minimize the production of non-condensable gases, $NO_2$ and $O_2$, that may be produced if the decomposition of the partially decomposed aluminum nitrate material of the bed is allowed to proceed to too great an extent, as may occur by cooperative action of too high a bed temperature with long residence times of the solids within the bed. The condition of the gases is judged by monitoring, in manner well known to the art, the heat-transfer coefficient of the heat-of-condensation-recovery means, which in known manner will decrease as the concentration of non-condensable gases increases. If the heat transfer coefficient is found to be lower than the design value, the temperature of the bed is lowered, in 5° to 10° increments, until the heat transfer coefficient has regained its desired value. The bed temperature, however, is maintained at the highest temperature level that yields a proper heat transfer coefficient to provide a sufficient rate of decomposition of the liquid layer on the particles to solid material, whereby the tendency of the particles to stick to one another is minimized.

It is suggested in the art that 90% or even 95% of the nitrate values contained in ANN can be separated from the alumina in a fluid bed operating around 200° C. and, if the off gases comprise a substantial amount of $H_2O$ vapor, the major portion of the nitrate values in the gases can be obtained as nitric acid when the gases are condensed at unspecified temperatures. FIGS. 7 and 8 of U.S. Pat. No. 3,869,543 presumably indicate low conversions of the input $HNO_3$ values to noncondensible $NO_X$ gases. It is well known in the art, however, that when gases containing $NO_2$ and water vapor are condensed at low temperatures, below 80° C. or so, two-thirds of the $NO_2$ can reconstitute to $HNO_3$ so rapidly that the reconstitution reaction may be confused with the direct condensation of $HNO_3$ (or of the anhydride $N_2O_5$). This does not occur at temperatures near the atmospheric or higher-pressure boiling temperatures of the nitric acid solutions, which exceed about 110° C. Thus, the operability of a condensor recovering the heat of condensation of the vapors for reuse in the process may be quite different from that of a condensor operating at temperatures too low for efficient reuse of the heat of condensation.

As the volume of the partially-decomposed material in the bed increases, the excess is conveyed by known means to a second indirectly-heated decomposer, which may be a rotary kiln but preferably is a fluidized bed, which is preferred because of the high heat transfer coefficients obtained therein, operating at a temperature upwards of about 300° C. and preferably within a range of about 340° to 400° C. at which temperature further decomposition of the partially-decomposed aluminum nitrate material proceeds to a nitrate composition of within a range of about 5 to 10 weight percent, at convenient solid residence times in the bed of about 1 to about 4 hours, with the production of nitrous gases consisting essentially of NO, $NO_2$, $O_2$ and $H_2O$. A portion of the nitrous gases exiting the bed is compressed in suitable compressor means and returned to provide the fluidizing medium of the bed and the remainder is passed to a nitric acid reconstitution system through suitable means which may include means for recovering a portion of the sensible heat contained therein. Higher decomposer temperatures and longer residence times than the stated preferred ranges may be employed if desired. However, increase of the residence time beyond that dictated by best design of the indirect-heat-transfer means requires the recirculation of larger portions of the off-gases with attendant increased power consumption. Also, we have found that the degree of decomposition of the partially-decomposed solid aluminum nitrate material is relatively unaffected by temperature within the range of about 370° to about 540° C. We prefer therefore to operate the bed at the lowest practical temperature that permits attainment of the aforesaid 5 to 100% nitrate concentration of the decomposed material at minimum practical solids residence times, which temperature does not exceed 400° C.

Excess bed volume accumulating in the second decomposer, by virtue of the continuous feed from the first decomposer, is fed in known manner to a third indirectly-heated decomposer, preferably a fluid bed for reasons stated above, in which preferably the fluidized bed is maintained, by virtue of the indirect heat transfer, at bed temperatures above about 540° C. and preferably within the range of about 675° to about 725° C. The degree of decomposition which can be achieved in reasonable solid residence times of say 1 to 2 hours, as measured either by the residual nitrate content of the decomposed material or by the loss-on-ignition at 1200° C., depends both upon the temperature and upon the rate at which the temperature is attained. A test subjecting the second decomposer product to rapid heat-up rates approaching those attainable by injecting solids into a fluid bed yielded residual nitrate contents of about 3½ to 5% and LOI values of 5 to 8% at temperatures within the range of about 540° to 620° C., residual nitrate values of less than 1% and LOI values of 3 to 5% at about 700° C., and nitrate values near zero at about 800° C. It was also observed that at the cited nominal retention times little or none of the alumina value is converted to the alpha crystal modification. Although an amount of alpha alumina may be desired in the final metallurgical grade alumina, it is not desired in the decomposers because the alpha modification is highly abrasive, and is also subject to autogenous grinding in the beds with attendant production of excessive fine materials which must be removed from the gaseous effluent. The substantial importance of residence time is indicated by the experience with the fluid bed aluminum nitrate decomposer of the AEC wherein, at a bed temperature of about 400° C. but with solids hold up times of the order of 50 hours, nitrate concentrations as low as 3% have been obtained with the simultaneous production of substantial amounts of the alpha alumina modification. Dust formation was so severe that boron compounds had to be added to the feed to the bed to suppress the alpha alumina formation.

It is known to incorporate the said second and third fluidized beds into a single shell with the second bed elevated above the third bed and to supply at least a portion of the fluidizing gases required in the second bed with off-gases from the third bed. It is also known to combine the two functions of the second and third beds into a single indirect-heated rotary calciner wherein bed temperatures increase continuously from the feed end to within the aforesaid 540° C. to 750° C. temperature range at the product discharge end. Since as aforesaid the attainable heat transfer-coefficients to the beds in rotary units are much lower than those attainable in fluidized beds a great deal more expensive equipment must be provided, and radiation and convection heat losses, i.e. wasted heat, will be larger.

The decomposed product of the third fluidized bed, preferably containing less than 1% nitrate, is moved by known means to a final direct-fired calcination means and exposed to temperatures upwards of about 1000° C., depending upon the permissable final water content, to complete the conversion to metallurgical grade alumina. To prevent atmospheric contamination with $NO_X$ the calciner is operated at slightly less than stoichiometric air-to-fuel ratio to reduce the $NO_X$ to $N_2$, and any unburned fuel is subsequently oxidized with excess air at lower temperatures in a waste-heat boiler, a method of operation that is well known in the art of operating stationary fired furnaces and boilers.

Methods for designing fluidized beds with low solids residence times are well known in the art.

These comprise:

1. The use of extended-surface (finned) heat-transfer tubes.

2. Use of minimum clearance, about 1 to 3 inches, between the tubes in the bundle.

Experimental data on items 1 and 2 particularly are presented in "Heat Transfer From Horizontal Tube Bundles to Air-Fluidized Beds" by Petrie, Freely and Buckham presented at the 60th annual A. I. Ch. E. meeting Nov. 26–30, 1967 at New York, N.Y.

3. Use of large length-to-diameter ratios for the bed, which is facilitated by the heat-transfer internals.

The following examples will serve to better illustrate the successful practice of the present invention.

EXAMPLE 1

A pilot scale test was conducted to demonstrate the decomposition of aqueous aluminum nitrate solutions. In this test, aluminum nitrate feed materials were melted and kept molten in a steam heated evaporator feed drum on a set of scales. The feed material, an aqueous aluminum nitrate solution of about the composition of melted aluminum nitrate nonahydrate crystals, was pumped at a selected rate by a piston metering pump to the tube side of a single-tube-in-shell, once through, steam heated inclined long tube evaporator. The long tube evaporator consisted of two approximately 17-foot heated lengths of 0.25 inch O.D. titanium tubing (0.028-inch wall) in series in shells of 2-inch iron pipe. Each of the two shell sections had steam supply means (100 psig plant process steam) at its top and condensate removal means at its lower end. The titanium tube was connected through a pressure-smoothing chamber to a metering pump at the lowest end; the two sections of the tube were joined together at the center and the top end of the tube extended about 18 inches into a 3-inch I.D.×4 ft. long Pyrex glass pipe, which served as the vapor head. The said Pyrex glass pipe was fitted at the top with a pressure gauge and a vapor exhaust pipe connected through a ball valve to a water-cooled condenser. The bottom of the glass vapor head was fitted with a discharge pipe to the fluidized bed decomposer.

The fluidized bed decomposer was fabricated of 304 stainless steel pipe consisting of an 8-inch diameter by 36-inch tall fluidized bed section and a 12-inch diameter by 18-inch tall vapor head. Fluidizing air was supplied at the bottom of the column through a plenum chamber and gas distribution plate with fourteen tuyeres. The air supply is heated with shell and tube steam heaters using plant 100 psig steam. At the top of the vapor head a 4-inch pipe outlet was connected to a cyclone dust collector. The 4-inch cyclone overflow line was connected to a water cooled condenser, and the outlet of the condenser was connected to a wet scrubber.

Concentrated liquid feed from the once through, long tube evaporator was introduced to the fluidized bed through a modified, concentric, air atomizing nozzle. The nozzle was a Spraying Systems Co., Wheaton, Illinois standard J Nozzle body with spray set up number 1-A in which the air cap hole size was increased to ⅛-inch to allow greater flow of atomizing air. Atomizing air and fluidizing air were metered by rotameters. Manometer taps were provided at the top of the vapor head, at two points 10 inches apart near the bottom of the fluidized bed and in the plenum chamber. With these measurements, the fluidized bed height could be determined. Thermo-couples connected to a multipoint strip chart recorder were provided at the bottom of the fluidized bed, at the top of the bed on four quadrants, at the top of the vapor head, in the feed line, and in the air supply line.

The cyclone dust collector downleg was equipped with a valve, which was periodically opened for discharge of dust. There was a product discharge pipe at the bottom of the fluidized bed, equipped with a valve. The top of the vapor head was equipped with a valved pipe through which dust or product could be returned to the bed.

Heat was supplied to the bed by 225 psig steam, generated in a portable generator, through nine stainless steel ¾-inch by 12-inch long heat exchanger tubes equipped with sixteen ⅜-inch by 1/16-inch spot welded, longitudinal fins for a total heat transfer area of approximately 17.7 square feet. The tubes were mounted vertically in the fluidized bed with eight tubes on the circumference and one in the center. Steam was admitted through a distribution block at the top of the assembly, and condensate was collected in a manifold at the bottom of the assembly and discharged through a steam trap. The feed tank, metering pump, evaporator, decomposer and transfer lines were insulated and steam traced to prevent heat loss.

During operation of the long tube, once-through evaporator, liquor from the feed tank was pumped by the metering pump through the pressure-smoothing chamber into the heated titanium tube. As the liquor flowed through the heated tube it was first heated to boiling and then partially evaporated. The resulting mixture of vapors and liquors was expelled as a jet from the upper end of the tube and impinged on a splash plate that served to separate the liquor from the vapor. The vapors rose in the Pyrex pipe and passed through the vapor line and valve and were condensed to nitric acid solution, which drained into a suitable receiver. The valve could be partially closed as desired to restrict the flow of vapor, thereby creating super-atmospheric pressure in the Pyrex pipe disengagement chamber.

Concentrated liquor was discharged from the long tube, once through evaporator under the pressure existing in the evaporator vapor head through a ¼-inch feed line into the decomposer feed nozzle. Atomizing air was metered into the feed nozzle to provide a calculated penetration depth of ¾-inch. This penetration depth was found to be important in avoiding nozzle scale formation.

In a successful test, lasting approximately 4 hours with 90 minutes of steady operation of the evaporation-decomposition system an aluminum nitrate feed solution analyzed as 8.99% $Al_2O_3$ and 46.72% $HNO_3$ was kept at a temperature of approximately 100° C. in the feed tank. The feed solution was pumped through the metering tank to the long tube, once through evaporator and evaporated to about 18% $Al_2O_3$. The steam pressure on the first section of the evaporator was about 45 psig and about 100 psig on the second section. The feed rate was initially set at 9.6 lb/hr. The analyzed concentration of the evaporator condensate was 45.11% $HNO_3$. The initial pressure (after start-up) of the evaporator vapor was set to 7 psig. The feed rate drifted down to about 4.8 lb/hr. during the 90 minutes of steady operation, and the pressure was increased to 11 psig. The steam pressure on the second section of the evaporator also was lowered to 65 psig to reduce the evaporator discharge concentration. The increased viscosity of the higher concentration feed made flow of evaporator discharge to the decomposer nozzle difficult.

The normal operating temperature in the fluidized bed was 370° F.; the normal steam pressure in the decomposer heat exchange tubes was 225–230 psig (397°–401° F.). This corresponded to a delta T of 25° to 30° F. between the steam and the fluidized bed.

The superficial fluidizing velocity in the fluidized bed was 0.30 feet per second. The fluidizing and atomizing air had been heated to 250° F.

The starting material for the fluidized bed was calcined alumina. A sample of the decomposer product was withdrawn, dissolved in hot water, and the soluble portion analyzed. The original alumina was insoluble in water, so the percent soluble was a measure of the extent of the decomposition. The soluble portion of the sample analyzed as 47.8% $Al_2O_3$ and 38.7% $HNO_3$ by weight. Examination of the feed nozzle revealed that no scaling had occurred during the run. A screen analysis was also performed on a sample of decomposer product. A screen analysis of the original metallurgical alumina is given for comparisons.

| Mesh | Decomposer Product-Percent | Metallurgical Alumina-Percent |
|---|---|---|
| −30 + 50 | 0.2 | 0.1 |
| −50 + 100 | 33.9 | 3.4 |
| −100 + 200 | 60.8 | 53.7 |
| −200 + 325 | 5.1 | 34.6 |

A comparison of the two screen analyses demonstrates the marked growth of the original alumina particles. The feed solution, introduced below the level of the fluidized bed, coated the bed particles, and as the water and nitric acid evolved, layers of basic aluminum nitrate were deposited on the existing bed particles.

This example demonstrates the successful evaporation of aluminum nitrate solution of very approximately melted aluminum nitrate nonahydrate composition to a concentration exceeding 18% $Al_2O_3$ without precipitation of basic aluminum nitrate with a condensable vapor of approximately 45% $HNO_3$. The run also demonstrated the successful feeding of aluminum nitrate solution through an atomizing nozzle using only pressure generated by evaporation in the long tube evaporator into a fluidized bed without scale formation.

EXAMPLE 2

Several runs were made to estimate the degree of decomposition of the condensable $HNO_3$ to non-condensable $NO_2$ and $O_2$ in the low temperature decomposer. Operation was substantially as described in Example 1. The steam pressure in the decomposer heat exchange tubes was maintained at about 225–230 psig and the decomposer bed temperature was varied by varying the rate of liquid feed to the evaporator and adjusting the evaporator heating-steam pressure and the pressure on the evaporator vapor head to obtain evaporated liquor comprising about 18% Al₂O₃ and 47% HNO₃. The total of the fluidizing and nozzle air supplied to the decomposer was kept constant at about 175 S.C.F. per hour.

Vapors produced in the decomposer were passed through a water-cooled, low temperature (27°–43° C.) condenser wherein substantially all of the condensable HNO₃ and water vapors were condensed; and the residual tail gas was sampled and analyzed for $NO_X$ values.

(a) At a feed rate of about 5.3 pounds per hour of the said evaporated liquor to the decomposer the bed temperature was about 191° C. and the $NO_X$ in the tail gas, expressed as $NO_2$, was found by assay to be 0.00014 pounds per S.C.F. of gas. After allowing for reconstitution of ⅔ of the initially-present $NO_X$ in the condensor, the estimated total concentration of the non-condensable $NO_2$ and $O_2$ in the decomposer vapors, on an air-free basis, was 2.2% by volume and of the water vapor 79.6% by volume.

It was judged that this low non-condensable gas concentration would be satisfactory for condensing the vapors in a high-temperature heat-of-condensation recovery means if the air was eliminated by using recycled vapors in place of the fluidizing and nozzle air.

(b) At a feed rate of 2.5 pounds per hour the decomposer bed temperature was 195° to 198° C. and the $NO_X$ concentration, expressed as $NO_2$, was 0.00025 pounds per S.C.F. of gas. The estimated total non-condensable $NO_2$ and $O_2$ in the decomposer off-gas on the air-free basis was 8.8% by volume and the water vapor was about 76% by volume.

It was judged that a useful amount of high-temperature heat of condensation could be recovered from gases of this composition but that a much larger condensor area would be required and that the proportion of heat recovered would be less than for vapors produced at the lower bed temperature of (a).

The cool condensate obtained during this test assayed 47.3% HNO₃ and 1.7% dissolved alumina by weight. It would be satisfactory for recycling to a process comprising the extraction of alumina values from, for instance, clay to prepare fresh aluminum nitrate feed liquor for the evaporator.

(c) Operation of the decomposer bed at higher temperatures, above about 200° C. resulted in an easily-visible brown coloration in the tail gas, indicating that a great deal more undesirable $NO_X$ was being produced in the decomposer than in test (b). It was concluded that operation at these temperatures was undesirable.

What is claimed is:

1. A process for the decomposition of aluminum nitrate to alumina comprising the steps of:
   (a) melting the aluminum nitrate crystals;
   (b) evaporating from the melted crystals in a once through evaporator at the boiling temperature of the crystals and for a time sufficient to remove water and associated nitric acid and to provide a fluid feed having an alumina concentration of at least about 18% by weight and capable of feeding through a nozzle;
   (c) decomposing the product of step (b) in a fluidized bed decomposer at a temperature of between about 150° and about 200° C. and recovering the heat of condensation of the resultant vapors for beneficial reuse;
   (d) decomposing the product of step (c) in a fluidized bed decomposer at a temperature of between about 300° and about 400° C. to reduce the residual nitrate concentration to between about 5 and about 10 weight percent;
   (e) decomposing the product of step (d) in a fluidized bed decomposer at a temperature of between about 540° and about 800° C. to reduce the residual nitrate concentration to below about 2 weight percent; and
   (f) calcining the product of step (f) at a temperature of at least about 1000° C.

2. The process of claim 1 wherein the first decomposition is carried out at a temperature of between about 170° and about 190° C.

3. The process of claim 1 wherein the second decomposition is carried out at a temperature of between about 340° and about 400° C.

4. The process of claim 1 wherein the third decomposition is carried out at a temperature of between about 680° and about 760° C.

5. The process of claim 1 wherein the residence time in the second decomposition ranges from about 1 to about 4 hours.

6. The process of claim 1 wherein the residence time in the third decomposition ranges from about 1 to about 2 hours.

* * * * *